United States Patent
Uchida

(10) Patent No.: US 9,997,185 B1
(45) Date of Patent: Jun. 12, 2018

(54) DATA STORAGE DEVICE EMPLOYING UPSAMPLING TO COMPENSATE FOR HIGH FREQUENCY REPEATABLE RUNOUT

(71) Applicant: Western Digital Technologies, Inc., San Jose, CA (US)

(72) Inventor: Hiroshi Uchida, Kanagawa-ken (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days. days.

(21) Appl. No.: 15/817,624

(22) Filed: Nov. 20, 2017

(51) Int. Cl.
*G11B 5/596* (2006.01)
*G11B 5/55* (2006.01)

(52) U.S. Cl.
CPC ...... *G11B 5/59688* (2013.01); *G11B 5/59622* (2013.01); *G11B 5/59627* (2013.01); *G11B 5/5534* (2013.01); *G11B 5/5547* (2013.01); *G11B 5/59661* (2013.01)

(58) Field of Classification Search
None
See application file for complete search history.

(56) References Cited

U.S. PATENT DOCUMENTS

| | | | |
|---|---|---|---|
| 5,822,147 A | 10/1998 | Kisaka | |
| 6,826,006 B1 * | 11/2004 | Melkote | G11B 5/59627 360/77.04 |
| 6,937,424 B2 | 8/2005 | Chang et al. | |
| 6,950,273 B2 * | 9/2005 | Nakagawa | G11B 5/59622 360/78.14 |
| 7,145,746 B1 * | 12/2006 | Hirano | G11B 5/59627 360/77.04 |
| 7,164,550 B2 | 1/2007 | Kisaka | |
| 7,265,933 B1 | 9/2007 | Phan et al. | |
| 7,315,430 B2 | 1/2008 | Kisaka | |
| 7,450,336 B1 * | 11/2008 | Wang | G11B 5/59627 360/77.04 |
| 7,876,523 B1 | 1/2011 | Panyavoravaj et al. | |
| 8,059,356 B2 | 11/2011 | Sakagami et al. | |
| 8,542,455 B2 | 9/2013 | Huang et al. | |
| 8,780,489 B1 * | 7/2014 | Gayaka | G11B 5/59627 360/78.05 |
| 8,953,271 B1 * | 2/2015 | Chayarangkan | G11B 5/59627 360/77.04 |
| 8,982,503 B1 * | 3/2015 | Chang | G11B 5/59627 360/75 |
| 9,001,454 B1 * | 4/2015 | Kim | G11B 5/5547 360/77.04 |
| 9,099,133 B1 | 8/2015 | Tang et al. | |

(Continued)

*Primary Examiner* — Tan X Dinh

(57) ABSTRACT

A data storage device comprising a head actuated over a disk comprising a plurality of tracks. The head is positioned over a target track, and a sampled position error signal (PES) is generated representing a position of the head relative to the target track. The sampled PES is filtered with a servo compensator to generate a sampled control signal, and the sampled control signal is upsampled to generate an upsampled control signal. The sampled PES is upsampled to generate an upsampled PES, and the upsampled PES is processed to generate compensation values. The upsampled control signal is combined with the compensation values to generate a compensated control signal, and the position of the head over the target track is adjusted based on the compensated control signal.

16 Claims, 4 Drawing Sheets

(56) References Cited

U.S. PATENT DOCUMENTS

| | | | | |
|---|---|---|---|---|
| 2001/0055177 A1* | 12/2001 | Cheung | ............... | G11B 5/5547 |
| | | | | 360/78.06 |
| 2002/0012191 A1* | 1/2002 | Ho | .................... | G11B 5/59627 |
| | | | | 360/77.04 |
| 2004/0228026 A1* | 11/2004 | Chang | ............... | G11B 5/59688 |
| | | | | 360/77.04 |
| 2013/0120873 A1* | 5/2013 | Huang | .................. | G11B 5/596 |
| | | | | 360/78.14 |

* cited by examiner

US 9,997,185 B1

DATA STORAGE DEVICE EMPLOYING UPSAMPLING TO COMPENSATE FOR HIGH FREQUENCY REPEATABLE RUNOUT

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
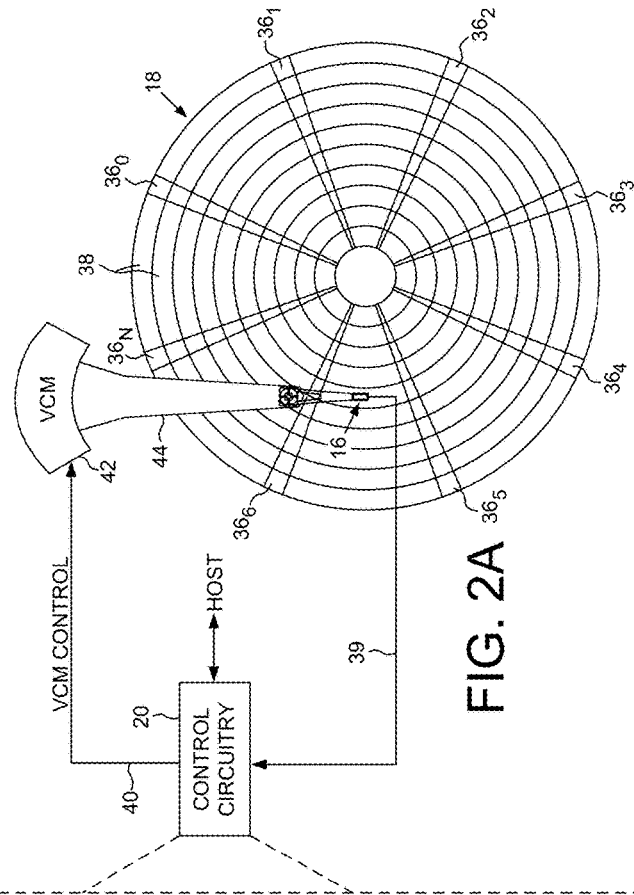
FIG. 2A shows a data storage device in the form of a disk drive according to an embodiment comprising a head actuated over a disk using an actuator, such as a voice coil motor (VCM) and optionally a microactuator.
Figure 2B:
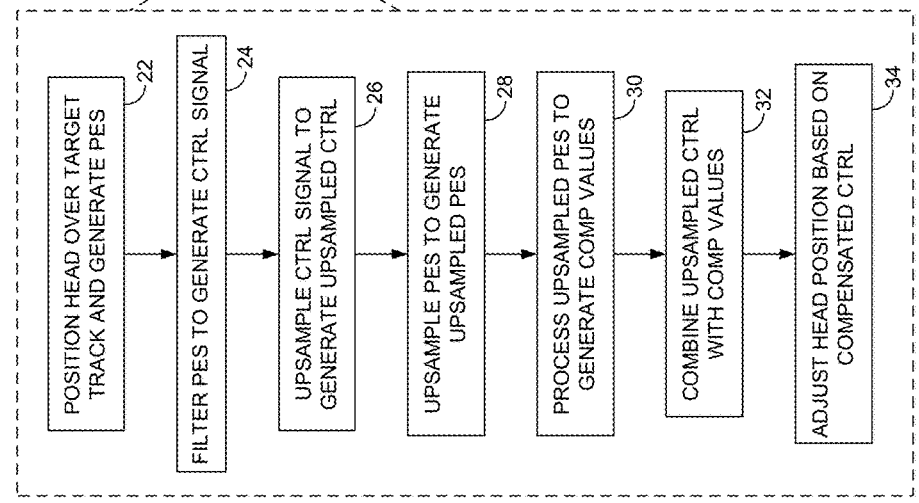
FIG. 2B is a flow diagram according to an embodiment wherein a sampled position error signal (PES) is upsampled, and the upsampled PES processed to generate disturbance compensation values that are combined with an upsampled control signal to generate a compensated control signal for controlling the actuator.

FIG. 2A shows a data storage device in the form of a disk drive according to an embodiment comprising a head 16 actuated over a disk 18, and control circuitry 20 configured to execute the flow diagram of FIG. 2B. The head 16 is positioned over a target track, and a sampled position error signal (PES) representing a position of the head relative to the target track is generated (block 22). The sampled PES is filtered with a servo compensator to generate a sampled control signal (block 24), and the sampled control signal is upsampled to generate an upsampled control signal (block 26). The sampled PES is upsampled to generate an upsampled PES (block 28), and the upsampled PES is processed to generate compensation values (block 30). The upsampled control signal is combined with the compensation values to generate a compensated control signal (block 32), and the position of the head over the target track is adjusted based on the compensated control signal (block 34).

Figure 1:
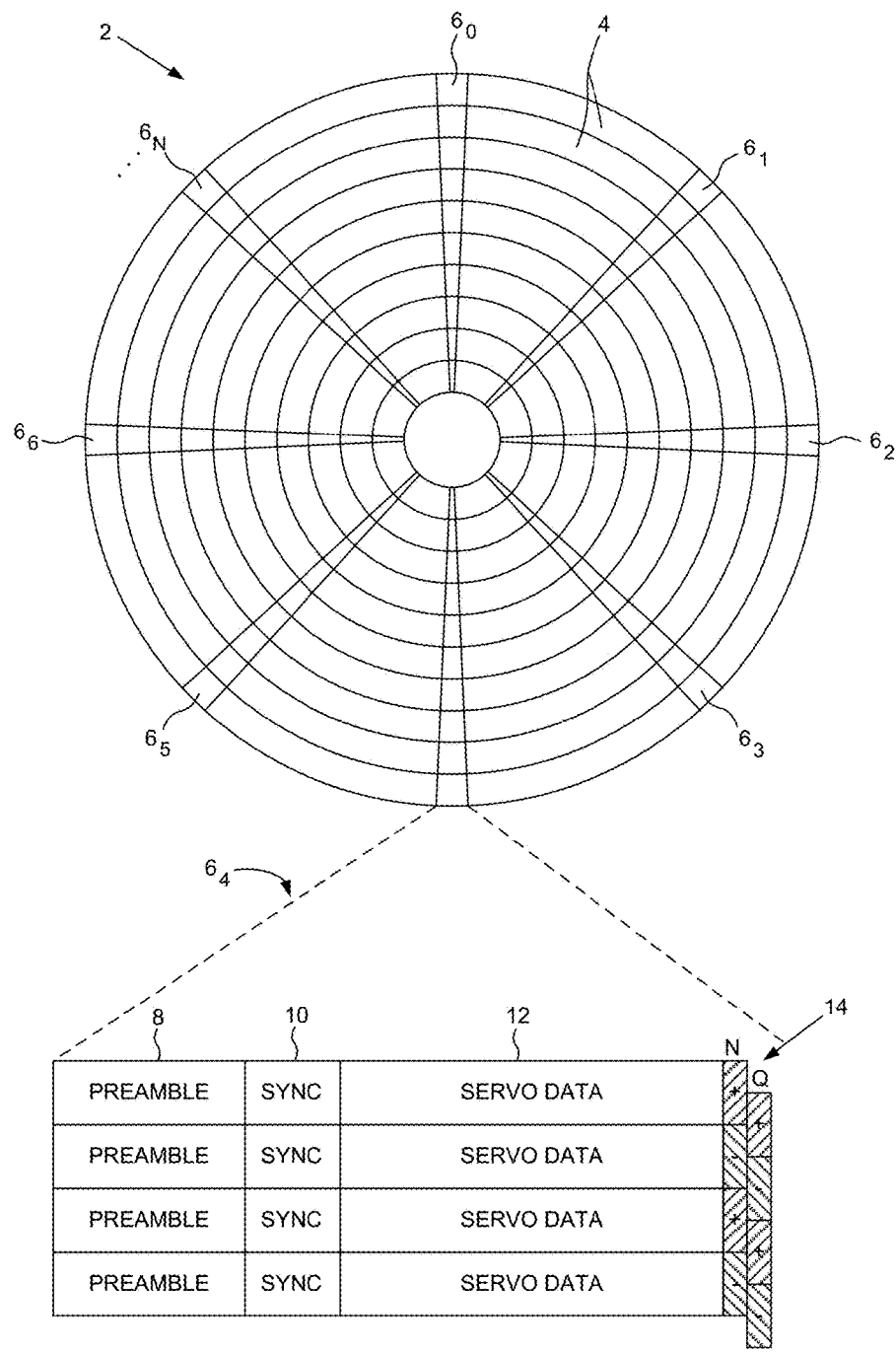
FIG. 1 shows a prior art disk format comprising a plurality of servo tracks defined by servo sectors.

In the embodiment of FIG. 2A, the disk 18 comprises a plurality of servo sectors $36_0$-$36_N$ that define servo tracks 38, wherein the servo sectors $36_0$-$36_N$ may comprise any suitable head position information, such as a track address for coarse positioning and servo bursts for fine positioning. Data tracks are defined relative to the servo tracks 38 at the same or different radial density. The control circuitry 20 processes a read signal 39 emanating from the head 16 to demodulate the servo sectors $36_0$-$36_N$ and generate the sampled PES representing an error between the actual position of the first head and a reference position relative to a target track. The servo bursts may comprise any suitable pattern, such as an amplitude based servo pattern or a phase based servo pattern (FIG. 1).

In one embodiment, the disk drive in FIG. 2A may further comprise a microactuator for actuating the head 16 over a target track in fine movements. The microactuator may be implemented in any suitable manner, such as a microactuator integrated into the head 16, integrated into a head gimbal assembly (HGA) which couples the head 16 to a suspension, or integrated into the suspension which couples the HGA to the actuator arm 44. Any suitable microactuator may be employed, such as a piezoelectric actuator which actuates electromechanically, or a thermal actuator which actuates through thermal expansion.

In one embodiment, the ability of the control circuitry to accurately track a target track is affected by repeatable runout (RRO) disturbances associated with the rotational frequency of the disk 18. For example, a RRO disturbance may be caused by an eccentricity of a written servo track due, for example, to a misalignment of the disk with respect to the center axis of a spindle motor which rotates the disk. Another source of RRO disturbance may be from the mechanics of the spindle motor, or from the control algorithm used to drive the spindle motor. For example, in one embodiment the spindle motor may be driven with a high frequency pulse width modulated (PWM) signal which can manifest as a high frequency RRO disturbance in the sampled PES used to actuate the head over the disk. As described below, in one embodiment the RRO disturbance may be compensated by generating RRO compensation values that are combined (feed-forward) with the actuator control signal to substantially cancel the effect of the RRO disturbance from the closed-loop feedback system.

In one embodiment, the frequency of the RRO (RRO frequency) may be higher than a Nyquist frequency associated with the sampled PES. However, a high frequency RRO may manifest as an aliased disturbance in the sampled PES at a frequency below the Nyquist frequency. In order to compensate for the high frequency RRO, the sampled PES is upsampled so that the RRO disturbance is generated at the RRO frequency in the upsampled PES. That is, sampling the position of the head at the frequency of the servo sectors in order to generate the sampled PES will result in an aliased RRO disturbance in the sampled PES, and upsampling the sampled PES will regenerate the RRO disturbance in the upsampled PES at the RRO frequency of the original RRO disturbance. The upsampled PES may then be processed to generate feed-forward RRO compensation values at the RRO frequency which can be used to adjust an upsampled control signal that controls the head actuator.

Figure 3A:
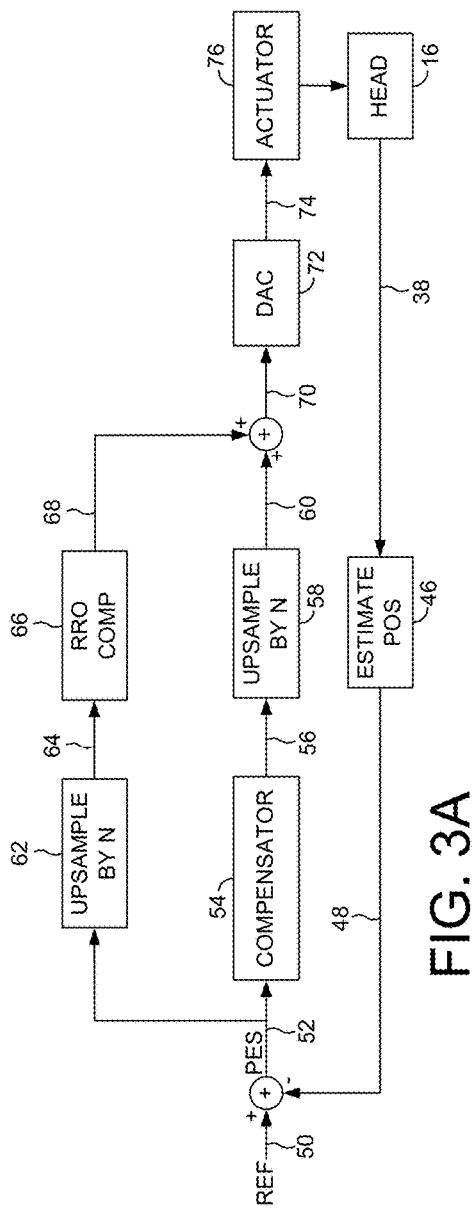
FIG. 3A shows control circuitry according to an embodiment wherein the disturbance compensation values compensate for a repeatable runout (RRO) disturbance having a RRO frequency higher than a Nyquist frequency associated with the sampled PES.

FIG. 3A shows control circuitry according to an embodiment wherein when the head 16 reads a servo sector, the read signal 39 is processed at block 46 to demodulate the servo sector information into an estimated head position 48 that is subtracted from a reference position 50 to generate a position error signal (PES) 52. In one embodiment, the estimated head position 48 is a digital value generated at the frequency of the servo sectors, and therefore the PES is a sampled PES 52 generated at the frequency of the servo sectors. The sampled PES 52 is filtered by a suitable compensator 54 to generate a sampled control signal 56 that is upsampled by a factor of N at block 58 to generate an upsampled control signal 60. The sampled PES 52 is upsampled at block 62 to generate an upsampled PES 64 that is processed at block 66 to generate compensation values 68. The compensation values 68 are combined with the upsampled control signal 60 to generate a compensated control signal 70 that is converted at block 72 into an analog control signal 74 applied to an actuator 76 configured to actuate the head 16 over the disk. The control circuitry shown in FIGS. 3A and 3B may be used to control any suitable head actuator 76, such as a VCM or any suitable microactuator.

Figure 3B:
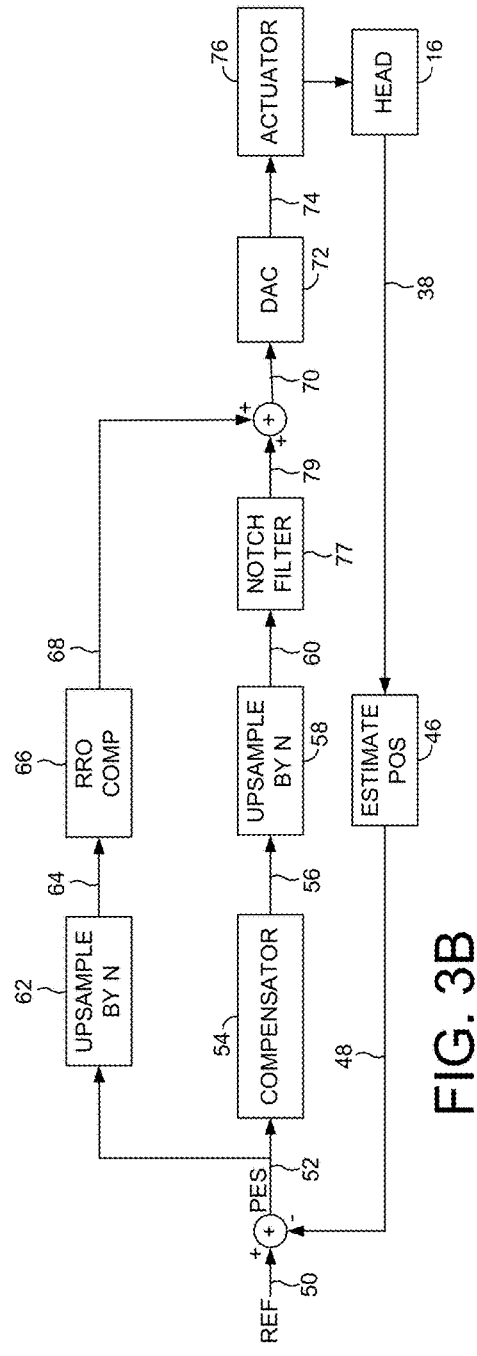
FIG. 3B shows control circuitry according to an embodiment comprising a notch filter for attenuating a mechanical resonance of the servo system that actuates the head over the disk.

FIG. 3B shows control circuitry according to an embodiment wherein the upsampled control signal 60 may be filtered by a suitable notch filter 77, for example, to attenuate a mechanical resonance of the servo system. In this embodiment, the upsampled-filtered control signal 79 output by the notch filter 77 may be combined with the compensation values 68 to generate the compensated control signal 70.

The upsampling blocks 58 and 62 shown in FIGS. 3A and 3B may implement any suitable factor of upsampling, and in one embodiment, the upsampling factor may be based on the RRO frequency that is aliased to the sampled PES 52. In one embodiment shown in FIG. 4B, an RRO disturbance 78 occurs at an RRO frequency that is 570× the rotation frequency of the disk which is between two and three times the Nyquist frequency 80 of the sampled PES. When generating the sampled PES at the frequency of the servo sectors, the RRO disturbance 78 manifests as an aliased disturbance 82 in the sampled PES as shown in FIG. 4B. Accordingly in this embodiment, the sampled PES is upsampled by a factor of three in order to generate the RRO disturbance 84 in the upsampled PES at the original RRO frequency of 570× (the upsampled PES comprises peaks at RRO frequencies of 102× and 366×, as well as 570×.) In one embodiment, the upsampled PES is processed at the original RRO frequency of 570× in order to generate RRO compensation values at this frequency.

Figure 4A:
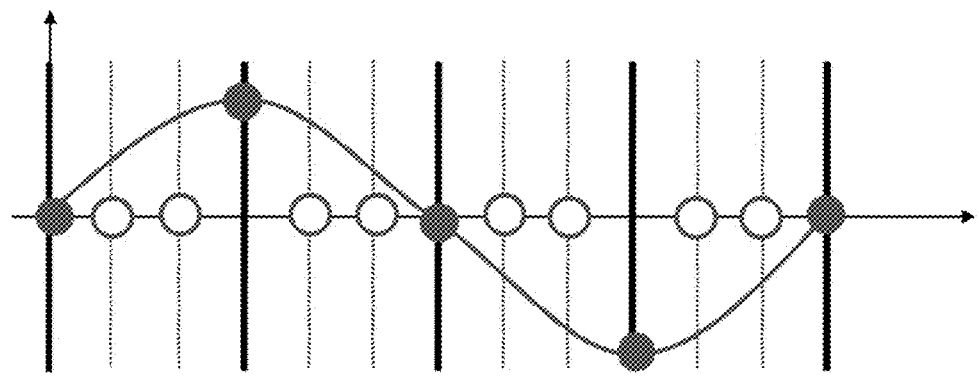
FIG. 4A shows an embodiment wherein the sampled PES is upsampled by a factor of three using an insert-zero upsampler.
Figure 4B:
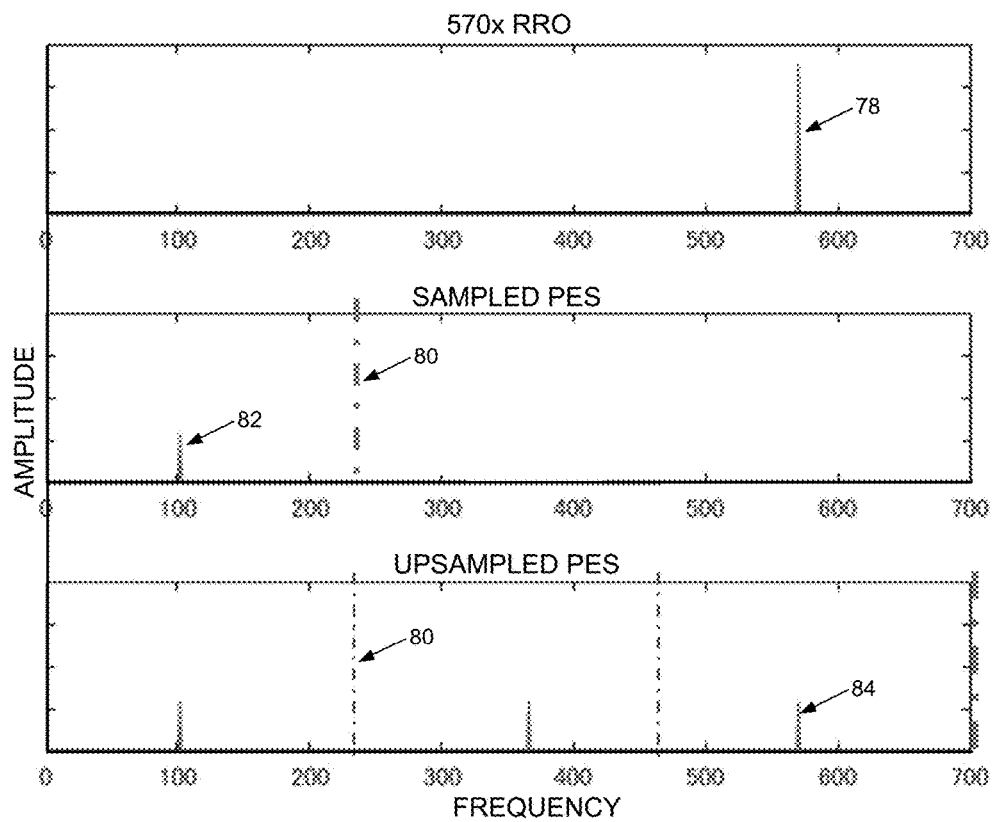
FIG. 4B shows an embodiment wherein the RRO disturbance is a 570×RRO that manifests as an aliased disturbance in the sampled PES, and which is generated in the upsampled PES at the RRO frequency by upsampling the sampled PES by a factor of three.

Any suitable technique may be employed in upsampling blocks 58 and 62 of FIG. 3, wherein FIG. 4A shows an embodiment wherein the upsampling blocks comprise a zero-insert upsampler which inserts zero samples between the samples of the original signal. In the embodiment of FIG. 4A, the upsampling blocks 58 and 62 upsample by a factor of three (N=3) which means two zero samples (represented by white dots) are inserted between each sample of the original signal (represented by black dots). Examples of other suitable upsampling techniques are disclosed in U.S. Pat. No. 8,542,455 entitled "DISK DRIVE UPSAMPLING SERVO CONTROL SIGNAL" and U.S. Pat. No. 9,099,133 entitled "DISK DRIVE SERVO CONTROL USING HYBRID UPSAMPLE FILTER," the disclosures of which are incorporated herein by reference.

Any suitable technique may be employed at block 66 of FIGS. 3A and 3B to generate the RRO compensation values 68 at the RRO frequency. In one embodiment block 66 may comprise a peak filter having a frequency response matched to the RRO frequency of the RRO disturbance. That is, the peak filter may comprise a bandpass frequency response at the RRO frequency, such as the 570×RRO frequency shown in FIG. 4B. In one embodiment, extracting the frequency component from the upsampled PES at the RRO frequency generates the RRO compensation values that are combined with the upsampled control signal in order to compensate for the RRO disturbance (e.g., RRO disturbance 78 shown in FIG. 4B). In one embodiment, the gain and/or phase response of the peak filter may be adjusted using the measured RRO disturbance in the upsampled PES as a feedback error signal. That is, the gain and/or phase response of the peak filter may be adjusted until the RRO disturbance in the upsampled PES is minimized. Any suitable peak filter may be employed, such as the peak filter disclosed in U.S. Pat. No. 5,822,147 entitled "POSITION CONTROL APPARATUS AND METHOD WITH A DIGITAL FILTER AND A PHASE CHANGE FILTER SECTION IN A DISK STORAGE DEVICE," the disclosure of which is incorporated herein by reference.

In an alternative embodiment, the RRO compensation values 68 may be generated by computing coefficients {a,b} of a sinusoid representing the repeatable runout disturbance:

$$a^*\cos(2\pi k/N)+b^*\sin(2\pi k/N)$$

where k is an index representing one of N samples of the upsampled PES over a revolution of the disk. The coefficients {a,b} may be computed in any suitable manner, such with an iterative learning algorithm:

$$a(k+1)=a(k)-G^*e(k)^*\cos(2\pi k/N)$$

$$b(k+1)=b(k)-G^*e(k)^*\sin(2\pi k/N)$$

wherein G is a predetermined gain and e(k) represents the upsampled PES. The above equation may be computed for a number of iterations (a number of disk revolutions) until the error signal falls below a predetermined threshold. Another technique for computing the coefficients {a,b} is described in U.S. Pat. No. 7,265,933 entitled "DISK DRIVE COMPUTING REPEATABLE RUN OUT WHILE ACTUATOR ARM IS PRESSED AGAINST A CRASH STOP" the disclosure of which is incorporated herein by reference.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk comprising a plurality of tracks;
   a head actuated over the disk; and
   control circuitry configured to:
   position the head over a target track;
   generate a sampled position error signal (PES) representing a position of the head relative to the target track;
   filter the sampled PES with a servo compensator to generate a sampled control signal;
   upsample the sampled control signal to generate an upsampled control signal;
   upsample the sampled PES to generate an upsampled PES;
   process the upsampled PES to generate compensation values;
   combine the upsampled control signal with the compensation values to generate a compensated control signal; and
   adjust the position of the head over the target track based on the compensated control signal.

2. The data storage device as recited in claim 1, wherein the compensation values compensate for a repeatable runout (RRO) disturbance having a RRO frequency higher than a Nyquist frequency associated with the sampled PES.

3. The data storage device as recited in claim 2, wherein the RRO disturbance manifests as an aliased disturbance in the sampled PES.

4. The data storage device as recited in claim 3, wherein upsampling the sampled PES generates the RRO disturbance in the upsampled PES at the RRO frequency.

5. The data storage device as recited in claim 1, wherein the control circuitry is further configured to upsample the sampled PES to generated the upsampled PES using an insert-zero upsampler.

6. The data storage device as recited in claim 1, wherein the control circuitry is further configured to upsample the sampled PES by a factor of three to generated the upsampled PES.

7. The data storage device as recited in claim 1, wherein the control circuitry is further configured to process the upsampled PES with a peak filter to generate the compensation values.

8. The data storage device as recited in claim 1, wherein the control circuitry is further configured to process the upsampled PES to generate compensation values by adjusting coefficients $\{a,b\}$ of a sinusoid:

$$a^*\cos(2\pi k/N)+b^*\sin(2\pi k/N)$$

based on the upsampled PES, where k is an index representing one of N samples of the upsampled PES per revolution of the disk.

9. A method of operating a data storage device, the method comprising:
   positioning a head over a target track on a disk;
   generating a sampled position error signal (PES) representing a position of the head relative to the target track;
   filtering the sampled PES with a servo compensator to generate a sampled control signal;
   upsampling the sampled control signal to generate an upsampled control signal;
   upsampling the sampled PES to generate an upsampled PES;
   processing the upsampled PES to generate compensation values;
   combining the upsampled control signal with the compensation values to generate a compensated control signal; and
   adjusting the position of the head over the target track based on the compensated control signal.

10. The method as recited in claim 9, wherein the compensation values compensate for a repeatable runout (RRO) disturbance having a RRO frequency higher than a Nyquist frequency associated with the sampled PES.

11. The method as recited in claim 10, wherein the RRO disturbance manifests as an aliased disturbance in the sampled PES.

12. The method as recited in claim 11, wherein upsampling the sampled PES generates the RRO disturbance in the upsampled PES at the RRO frequency.

13. The method as recited in claim 9, wherein upsampling the sampled PES to generate the upsampled PES comprises inserting at least one zero-sample between consecutive samples of the sampled PES.

14. The method as recited in claim 9, wherein upsampling the sampled PES to generate the upsampled PES comprises upsampling the sampled PES by a factor of three to generated the upsampled PES.

15. The method as recited in claim 9, wherein upsampling the sampled PES to generate the upsampled PES comprises processing the upsampled PES with a peak filter to generate the compensation values.

16. The method as recited in claim 9, wherein processing the upsampled PES to generate compensation values comprises adjusting coefficients $\{a,b\}$ of a sinusoid:

$$a*\cos(2\pi k/N)+b*\sin(2\pi k/N)$$

based on the upsampled PES, where k is an index representing one of N samples of the upsampled PES per revolution of the disk.

* * * * *